Patented Jan. 26, 1954

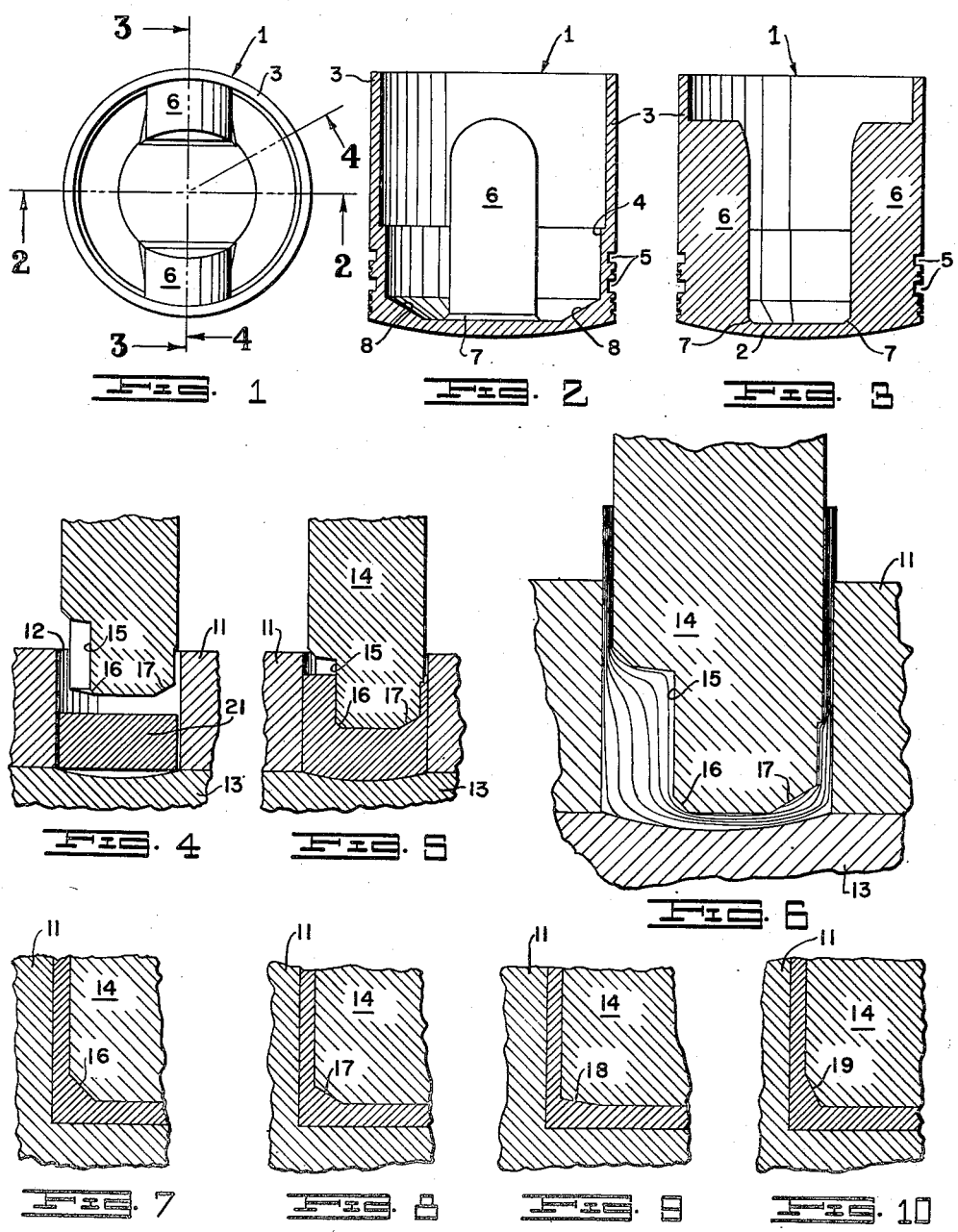

2,667,390

UNITED STATES PATENT OFFICE 2,667,390

PISTON OR LIKE CUP-SHAPED ARTICLE

Romaine Elden Watson, Los Angeles, John R. Boston, West Los Angeles, and Carl Lehmeier, Santa Monica, Calif., assignors to Metalflo Corporation, a corporation of Nevada Application June 26, 1948, Serial No. 35,388

2 Claims. (Cl. 309—10)

Our invention relates to pistons or similar objects of cup-shape and to methods of and apparatus for making the same.

It has heretofore been the practice in the manufacture of pistons or articles of similar shape to cast them in sand or permanent molds, to die cast them, to forge them, or to draw them from sheet material. Each method offers certain advantages but has certain disadvantages. For example, casting, whether in sand or in permanent molds, results in a product having poor strength characteristics, requiring heavy sections, having poor dimensional tolerances, requiring excessive machining, and high rejection losses due to exposed and hidden voids and inclusions. Die casting, though having good dimensional tolerances, is limited to low strength low melting and usually heavy metals. Hot forging, while tending to develop to some extent the strength of a given material, often necessitates several forming steps and several cycles of heating and annealing. Drawing operations are limited to sheet material and although the material may exhibit its maximum strength characteristics, the inherent requirement of uniform and thin sections virtually eliminates the use of drawing operations for such articles as pistons.

As noted, sheet material, by the nature of its manufacture, exhibits virtually the maximum strength qualities of a given metal. This is likewise true of extrusions. This is due in part at least to the fact that the material is cold worked until the crystalline or grain structure is disposed substantially parallel to the surface of the material and its change in form while being cold worked is due to slip-plane movement of its crystalline structure resulting in maximum bonding and cohesion between the crystals. Furthermore, all voids are eliminated and maximum heat conductivity is developed by the close and intimate contact between the crystals or grains comprising the material.

Our invention involves a piston or article of similar cup-shape which has been extruded from a blank into cup form in such a manner that the slip-plane movement is controlled and guided to dispose the grain or slip-planes of the material substantially parallel to the surfaces of the article much in the manner of sheet of extruded material.

Accordingly then, included in the objects of our invention are:

First, to provide pistons or articles of similar shape from aluminum, magnesium, cupric and even ferris alloys exhibiting superior qualities such as high density, excellent surface finish, uniform and properly oriented grain structure for maximum strength and close dimensional tolerances.

Second, to provide such cup-shaped metal articles wherein the metal is subjected to high pressures and caused to cold-flow uniformly by slip-plane elongating movement from an initially disc-shaped blank into cup form, such cold flow being guided at the periphery of the blank so that the grain structure is directed axially into the walls of the article being formed, such apparatus and method combining the advantages inherent in forging, die casting, extruding, and deep drawing techniques while avoiding their inherent deficiencies.

Third, to provide cup-shaped metal articles by a flow of metal from a blank into the walls of the resulting articles which is controlled and proportioned to correspond to variations in the thickness of one part of the wall as combined to another, thus permitting the formation of integral solid bosses or ribs therein.

Fourth, to provide deep cup-shaped objects such as pistons by a single working stroke as distinguished from the progressive series of strokes required in deep drawing or in forging operations.

Fifth, to provide light weight alloy pistons which are inherently less expensive than pistons heretofore made for comparable uses, both in the actual forming operations and in the subsequent finishing operations.

Sixth, to provide as an article of manufacture a light weight alloy piston or similar object which exhibits superior physical properties, that is, develops the maximum strength of the material employed.

With the above and other objects in view as will appear hereinafter, reference is directed to the accompanying drawings in which:

Figure 1 is an end view of a finished piston formed by our method and apparatus.

Figure 2 is a sectional view thereof through 2—2 of Figure 1.

Figure 3 is a sectional view thereof through 3—3 of Figure 1.

Figures 4, 5 and 6 are fragmentary and progressive diagrammatical views all representative of section 4—4 of Figure 1 illustrating our apparatus and disclosing the operation of our method, Figure 6 being enlarged and flow lines representing diagrammatically the movement of the metal being substituted for section lines of the article in order to facilitate the illustration.

Figures 7, 8, 9 and 10 are enlarged fragmentary substantially diagrammatical views indicating the effect of change in form of the die ram employed in our method and included in our apparatus.

For purposes of illustration, a piston is selected as representative of an article of this invention. The piston designated 1 comprises a head 2, an integral skirt 3, the walls of which are thickened forming a ring flange adjacent the head as indicated by 4 to permit machining of ring grooves 5. Formed integrally with the head 2 and skirt 3 is a pair of diametrically disposed wrist pin bearing bosses 6 in the form of integral axially directed ribs. It will be observed that the juncture between the bosses 6 and the head 2 is defined by a bevel 7 whereas the juncture between the head and the skirt of the piston is provided with a bevel 8. These bevels aid in forming the piston, as will hereinafter appear.

The apparatus for forming the piston includes a die plate 11 having a die cavity 12. The die plate may rest on a separate base 13 or such base, forming the lower end of the die cavity, may be integral with the die plate. The die cavity need not extend the entire height of the outer side of the article for reasons which will be brought out hereinafter.

A die ram 14 is adapted to enter the die cavity 12. The die ram defines the inner surfaces of the head and walls of the completed article. If such article be the piston illustrated, the die ram 14 is provided with diametrical recesses 15 in which are formed bosses 6.

The extremity of the die ram delineating the piston head end of the wrist pin bosses 6 is preferably provided with abrupt beveled edges 16 which are shown as disposed at approximately 45 degrees. The circumferential inner edge of the die ram between the bosses is preferably provided with a more extended flatter angle bevel as at 17, forming the bevel 8 in the piston head. It has been found that the rate of flow of the metal over the bevel edges 7 into the cavities forming the substantially thicker portions constituting the bosses 6 as compared to the rate of flow over the bevel, such as at 17, into the relatively thin wall portion, is such that the progress of the flow of metal upwardly along the punch is at a substantially uniform longitudinal rate.

It has been found in actual practice that with a punch designed substantially as shown and described, that the larger quantity of metal flowing into the boss portions will be maintained at a rate such that the thinner wall adjoining the boss and connecting between them; namely, the portions 4 and 3, will continue with sufficient uniformity that the piston blank, substantially as shown in Figs. 1, 2, 3, and 6, will be satisfactorily formed while maintaining the important and desirable non-ruptured uniform connection between the boss and circumferential wall portions 4 and 3.

Figs. 7 and 8 indicate the type of bevels 16 and 17, respectively formed and located as shown at 16 and 17 in Figs. 4, 5, and 6. Fig. 9 shows at 18 a flatter, that is a more nearly radial slope, which may have the effect of changing the rate of flow, and may be desirable when the thickness of the wall 4 is varied. The more nearly cylindrical slope, shown at 19 in Fig. 10, may choke or disturb the flow and cause galling. Usually this type of flow is to be avoided.

The piston is formed from a blank 21 of metal, for example, aluminum alloy. This blank may be cut or punched from sheet stock of a requisite thickness in which case the grain structure or crystalline structure is initially oriented transversely to that of bar stock such as extruded or rolled stock. In such bar stock blanks the grain or crystalline structure is wholly oriented parallel to the axis of the die ram. In either case, when pressure is applied to the blank by the ram as shown in Figure 5, the material is caused to flow or extrude upwardly around the die ram. The grains or crystals comprising the material turn from either their horizontal or vertical position as they are guided around the periphery of the die ram, until they are in substantial parallelism with the vertical surfaces of the die cavity and the die ram. That is, in the case of the piston illustrated in the slip planes of the crystalline structure comprising the material are directed into substantial parallelism with the surface of the skirt and the bosses of the piston, and, irrespective of their original orientation they are forced, particularly at the periphery of the head portion of the piston into parallelism with the surfaces of the head.

From the foregoing it will be noted that whatever may be the original formation of the grain structure in the original blank, the subsequent flow of metal will effect approximately the parallel formations indicated in Fig. 6.

The continued downward movement of the ram causes additional material to be guided upwardly against the metal initially forced into the peripheral wall spaces between the die ram and the die cavity. If no further change in dimension occurs, the metal merely slides upwardly along the die ram so that the height of the side walls is limited only by the supply of material in the blank. Changes in the shape of the die ram, such as the shoulder formed by the upper extremity of the thickened wall 4 and the upper extremity of the upper boss 6, causes additional cold flow in these regions.

Once such flow is initiated by pressure of the die ram, this pressure is maintained or even increased so that flow does not stop until the stroke of the ram is completed as shown in Figure 8. After the forming operation is completed, the die ram is removed and the resulting article stripped therefrom. It should be observed that the die plate need not extend to the top of the finished article, instead, the die plate need not be appreciably higher than the bosses 6 or other point of change in wall thickness. As previously pointed out, this is due to the fact that flow of the material stops when the deforming pressure thereon ceases.

It should be noted that our process is essentially a cold forming process, although the dies in use become moderately heated, and in fact the blanks may be preheated; not, however, to the extent employed in hot forming or forging processes, as such high heating impairs the essential crystalline structure and the desired slip plane movement.

In order to illustrate the significant grain or crystalline structure of the article formed by our apparatus and method, sectioned lines are omitted from the article in Figure 6, and instead flow lines are drawn to indicate diagrammatically the typical slip-plane flow of the material during the forming processes.

The flow lines are based on actual etched micrographs.

Having fully described our invention, it is to be understood that we do not wish to be limited to the details herein set forth, but our invention is of the full scope of the appended claims.

We claim:

1. A hollow piston having an integral head portion, a ring flange portion, opposed wrist pin boss portions, and a skirt portion, each formed from metal displaced from a blank, said head portion having a crystalline structure with unbroken slip-planes continued from the slip-planes of said head portion and extending parallel to the inner and outer faces of the ring flange, said boss portions having a crystalline structure with unbroken slip-planes extended from the head portion and parallel with the inner and outer faces of the boss portions, said skirt portion having a crystalline structure with unbroken slip-planes extended from the ring flange and substantially parallel with the inner and outer faces of the skirt portion, said ring flange portion terminating intermediate the ends of the wrist pin bosses and being substantially thicker than the skirt portion and thinner than the wrist pin bosses, said wrist pin bosses extending from the head portion and being substantially thicker than the ring flange and skirt portions, with the opposed inner faces thereof in substantially parallel relation, and said ring flange and skirt having substantially parallel inner and outer faces, whereby unbroken slip-planes of the metal extend from the head through sections of widely varying thickness to the extremity of the uniformly thin skirt portion.

2. A one piece trunk type metal piston which comprises a head, opposed wrist pin bosses depending from said head, a skirt depending from the head, said pin bosses being substantially thicker than said skirt and extending only across localized opposed areas on the inner face of the skirt, said skirt and said pin bosses having substantially uniform thicknesses throughout the longitudinal extent thereof with the opposed inner faces of the pin bosses being substantially parallel to each other and the inner and outer faces of the skirt being substantially parallel, and said piston having a crystalline structure with unbroken metal slip-planes extending from the head into the pin bosses and skirt and being parallel with the inner and outer peripheral faces thereof.

R. ELDEN WATSON.
J. R. BOSTON.
CARL LEHMEIER.

References Cited in the file of this patent

UNITED STATES PATENTS

| Number | Name | Date |
|---|---|---|
| 1,440,549 | Parkhurst | Jan. 2, 1923 |
| 1,774,824 | Dow et al. | Sept. 2, 1930 |
| 1,929,802 | Brauchler | Oct. 10, 1933 |
| 1,936,598 | Handler | Nov. 28, 1933 |
| 2,096,513 | Handler | Oct. 19, 1937 |
| 2,244,954 | Lenz et al. | June 10, 1941 |
| 2,392,925 | Kelleher | Jan. 15, 1946 |
| 2,465,792 | Davis | Mar. 29, 1949 |

FOREIGN PATENTS

| Number | Country | Date |
|---|---|---|
| 248,720 | Great Britain | June 10, 1927 |

OTHER REFERENCES

"Extrusion of Aluminum Parts for Douglas Aircraft," by J. R. Boston in "Machinery," July 1945, pgs. 139 to 147.